Patented Feb. 14, 1950

2,497,303

UNITED STATES PATENT OFFICE 2,497,303

REACTION BETWEEN OLEFINIC COMPOUNDS, CARBON MONOXIDE, AND HYDROGEN IN THE PRESENCE OF A METAL CARBONYL CATALYST

William F. Gresham and Richard E. Brooks, Wilmington, Del., assignors to E. I. du Pont de Nemours & Company, Wilmington, Del., a corporation of Delaware No Drawing. Application May 23, 1945, Serial No. 595,474

3 Claims. (Cl. 260—604)

This invention relates to the synthesis of organic oxygen-containing compounds, and in particular to the synthesis of organic oxygen-containing compounds by employing a metal carbonyl catalyst for the reaction between organic unsaturated compounds, carbon monoxide, and compounds capable of adding to organic unsaturated compounds.

An object of this invention is to provide an improved method for preparing organic oxygen-containing compounds from olefinic compounds, carbon monoxide and hydrogen. Another object is to provide an improved process for the synthesis of propionaldehyde and higher aldehydes from organic unsaturated compounds containing olefinic unsaturation, carbon monoxide, and hydrogen, in the presence of certain highly active catalysts, e. g., metal carbonyls, as described in detail hereinafter.

In the copending application Serial No. 598,208, filed June 7, 1945, now matured to U. S. Patent No. 2,437,600, dated March 9, 1948, it is disclosed that propionaldehyde and higher aldehydes may be prepared in excellent yield by reaction between unsaturated compounds containing olefinic unsaturation, carbon monoxide and hydrogen at pressures in excess of 300 atmospheres, in the presence of hydrogenation catalysts.

It has been discovered in accordance with the present invention that certain metal carbonyls, which heretofore have been found to be unsatisfactory as catalysts in ordinary hydrogenation reactions since they themselves are easily decomposed or hydrogenated, are outstandingly excellent catalysts for the synthesis of aldehydes by the simultaneous reaction between carbon monoxide, hydrogen and compounds containing olefinic unsaturation. These catalysts are so efficient that they exert a profound effect when present in relatively minute concentrations. Moreover, they are effective when employed in the liquid phase and are substantially completely recoverable from the reaction mixture. These properties make the carbonyls highly valuable as catalysts in continuous processes for the synthesis of aldehydes from olefines, carbon monoxide and hydrogen, especially in processes in which the carbonyl is recovered as such and recycled to the reaction mixture. The present invention provides a process for the preparation of oxygen-containing organic compounds which comprises reacting an organic unsaturated compound containing olefinic unsaturation simultaneously with carbon monoxide and hydrogen in the presence of a catalyst consisting of a metal carbonyl.

While metal carbonyls in general are effective in the practice of the invention, outstanding results are obtained with carbonyls of metals having atomic numbers of from 26 to 28 inclusive, namely, carbonyls of the class consisting of cobalt, nickel and iron carbonyls. The amount of catalyst is preferably within the range of about 0.1 to 10%, based on the total weight of the reaction mixture, but it has been observed that the cobalt carbonyl catalysts exert an effect even when present to the extent of only about 200 parts per million or even less.

The formation of oxygen-containing products from olefinic compounds, carbon monoxide and hydrogen involves competing reactions. As an illustration, in the synthesis of oxygen-containing compounds from ethylene, carbon monoxide and hydrogen, by methods of the prior art, at pressures below 300 atmospheres, the following two reactions and various others may occur.

(1)  $CH_2=CH_2+CO+H_2 \rightarrow CH_2CH_2CHO$
(2)  $2CH_2=CH_2+CO+H_2 \rightarrow CH_3CH_2COCH_2CH_3$ It was not known heretofore how to control these various reactions so as to produce a predominantly aldehydic product. According to the conventional rules of chemistry, the effect of increased pressure on such competing reactions normally would be to favor the reaction which is accompanied by the greater volume decrease, and to suppress the reaction which is accompanied by the lesser volume decrease. However, according to this invention, an anomalous effect is observed at elevated pressures. Instead of suppressing Reaction 1, which is accompanied by the lesser volume decrease, the effect of pressure is to suppress Reaction 2, thereby making possible the formation of the aldehyde via Reaction 1 in high yield.

The reaction between the olefinic compound, carbon monoxide and hydrogen in the presence of the aforesaid metal carbonyl compounds as catalysts is generally conducted at a temperature of about 75° to 250° C., preferably 100° to 200° C., according to the invention. The process may be carried out at ordinary or superatmospheric pressures, especially at pressures of from 50 atmospheres to 1500 atmospheres. At pressures in excess of 300 atmospheres, especially above about 375 atmospheres, the reaction product is predominantly aldehydic. The maximum pressure which may be employed is determined by the strength of the retaining vessel and may be as high as 3000 atmospheres or even higher.

The relative proportions of reactants may be the stoichiometrically required quantities, although other proportions may be employed if desired. Excellent results are obtained when the molar ratio of CO:H₂:olefine is within the range of about 1:2:1 to about 2:4:1, but such an excess of hydrogen is not at all indispensable.

In one method of practicing the invention, the olefinic compound and a solution of the metal carbonyl are placed in a pressure-resistant vessel, and a mixture of carbon monoxide and hydrogen is injected therein under high pressure. Thus, the advantages of the invention are gained by employing a reaction mixture which initially contains the carbonyl. A polymerization inhibitor may also be present in the mixture if desired. After the reaction is completed, the resulting reaction product may be removed from the pressure-resistant vessel, and the catalyst may be recovered by any convenient method. The oxygen-containing organic compounds produced by the reaction are likewise separated from the mixture by any suitable method, such as fractional distillation.

Since the metal carbonyl catalysts are volatile compounds which in many instances decompose during distillation of the crude reaction products, a vexatious problem is encountered in attempting to separate the carbonyl catalyst from the aldehydic product substantially quantitatively, and without decomposition. According to the invention, carbon monoxide under high pressure is effective in suppressing the thermal decomposition of thermally unstable carbonyls (such as cobalt carbonyl), and these carbonyls can be employed conveniently, without decomposition, at elevated temperatures in catalytic processes, or in processes for recovering such carbonyls from mixtures with other substances, by imposing a high pressure of carbon monoxide thereon. Accordingly, a convenient method for recovering the carbonyl catalyst, and aldehyde (particularly a low-boiling aldehyde such as propionaldehyde or the butyraldehydes, i. e., the aldehyde derived from monoolefines having not more than 3 carbon atoms), from the reaction product obtained in the olefine —CO—H₂ reaction is to conduct carbon monoxide through the liquid reaction product at a temperature of about 100° to 200° C., under a pressure of about 100 to 1500 atmospheres, and thence to decrease the pressure on the resultant effluent gas to about atmospheric pressure, whereby a portion of the aldehyde in the said gas separates, and thereafter to scrub the effluent gas with an inert organic liquid solvent, preferably at a temperature below 0° C. In this manner, the aldehyde is obtained in the solvent, substantially free of any contamination with the catalyst. Any cobalt or nickel carbonyl which is carried out of the reaction mixture during the operation of this recovery process is generally collected prior to scrubbing the gas with the solvent. The recovered catalyst can be recycled to the reaction vessel.

The unsaturated compounds employed as reactants according to the invention include the olefines (monoolefines, diolefines), aryl substituted olefines, and other substituted olefines such as the ethers, esters, carboxylic acids, halides, ketones, aldehydes, anhydrides, etc., containing olefinic unsaturation. Sterically-hindered olefinic compounds, such as tetramethyl ethylene, may also be used; frequently such compounds react with carbon monoxide and hydrogen according to the invention, to yield products having aldehyde groups attached to carbon atoms other than the carbon atoms which are separated by the sterically-hindered olefinic bond.

If desired, any inert liquid may be employed as a reaction medium. When such a medium is employed, solvents in which the metal carbonyls are readily soluble and stable are preferred. When the metal carbonyl catalyst is to be recovered by separating the aldehydic product therefrom at elevated temperature under high carbon monoxide pressure as above described, it is desirable that the inert liquid be relatively high-boiling, e. g., its boiling point should be above the boiling point of the principal aldehydic product. A suitable inert solvent is xylene or diethyl benzene in any of their isomeric forms. Examples of other solvents which may be used are cyclohexane, ethylbenzene, saturated esters and saturated ethers.

The invention is illustrated further by means of the following examples.

*Example 1.*—A mixture containing 128 cc. of cyclohexane and 10 grams of finely divided reduced, sintered cobalt oxide was placed in a silver-lined shaker tube and heated for two hours at a temperature of 140° to 160° C. under a pressure of 650 to 750 atmospheres of carbon monoxide. Approximately 2.5 grams of the cobalt went into solution in the form of cobalt carbonyl. The resulting product was filtered, and diluted until the concentration of cobalt carbonyl corresponded to 0.01 gram (as Co) per cc. A portion of this solution (58 cc.) was transferred to another shaker tube, and a mixture of 70 cc. cyclohexane and 28 grams of ethylene was introduced. The resulting mixture was heated for 45 minutes at a temperature of 110° to 172° C. under a pressure of 375 to 725 atmospheres of a gas which consisted of 2 volumes of hydrogen per volume of carbon monoxide (hereinafter called CO:2H₂). The reaction product was discharged from the shaker tube and was distilled, yielding 39.7 grams of propionaldehyde, and 10 grams of the azeotrope of n-propanol and cyclohexane.

*Example 2.*—A mixture containing 100 grams of cyclohexane, 24.3 grams of iron carbonyl and 28 grams of ethylene was heated for one hour at a temperature of 130° to 200° C. under a pressure of 440 to 740 atmospheres of CO:2H₂. The resulting product was distilled yielding 6.2 grams of a fraction boiling from 45° to 73° C. (which was a mixture of propionaldehyde and n-propanol, contaminated with iron carbonyl), and 35.7 grams of a cyclohexane foreshot, boiling up to 81° C., which was found to have an n-propanol content of 7.8%.

*Example 3.*—A mixture containing 68.8 grams of vinyl acetate, 42 grams of cyclohexane, 10 cc. of a cobalt carbonyl solution (1 gram of Co per 100 cc. of cyclohexane), and 1 gram of hydroquinone was heated in a shaker tube for two hours at a temperature of 100° to 120° C. under a pressure of 290 to 700 atmospheres of CO:H₂. Distillation of the reaction product gave 5.8 grams of acrolein and 11.0 grams of alpha-acetoxypropionaldehyde.

*Example 4.*—A mixture containing 68.8 grams of vinyl acetate, 37.2 grams of methyl acetate and 0.1 gram of cobalt (present as cobalt carbonyl) and 1 gram of hydroquinone was heated for two hours at a temperature of 100° to 110° C. under a pressure of 275 to 740 atmospheres of CO:H₂. Distillation of the resulting product gave three fractions: (1) a foreshot, B. P. up to 60° C. at atmospheric pressure (weight, 43.8 grams); (2)

an intermediate cut, B. P., 34° to 51° C. at 30 mm. (weight 4.6 grams); and (3) a high-boiling cut, B. P., 50° to 62° C. at 30 mm. (weight, 31.3 grams). The first of these fractions was found, by analysis for carbonyl content before and after hydrolysis, to contain 11 grams of acrolein and 17.2 grams of recovered vinyl acetate. The third fraction also was analyzed for carbonyl content, which showed that it contained 27.4 grams of alpha-acetoxy-propionaldehyde.

*Example 5.*—A mixture containing 1 gram of Co(CO)$_4$ in 100 cc. of cyclohexane, and 84 grams of tetramethylethylene was heated at 173° to 235° C. under a pressure of 550 to 700 atmospheres of CO:2H$_2$ for 13 minutes. The chief product was an aldehyde of the formula C$_6$H$_{13}$CHO, B. P. 67° at 70 mm. to 65° C. at 12 mm. (conversion, 23.1%), identified as beta, gamma-dimethylvaleraldehyde. A fraction also was obtained at 75°/6 mm. to 133° C./1 mm., which corresponded to a 24.7% conversion to a trimeric aldehyde of the formula (C$_6$H$_{13}$CHO)$_3$.

*Example 6.*—A mixture containing 43 grams of methyl acrylate, 117 grams of benzene and 3.04 grams of a 15.5% solution of Co(CO)$_4$ in cyclohexane (cobalt content of reaction mixture, 0.1%) was processed at a temperature of 145° to 155° C. for 30 minutes under a pressure of 390 to 690 atmospheres of CO:2H$_2$. Distillation of the resulting product gave 20.7 grams of methyl 4-oxobutyrate, B. P. 61° to 62.5° at 8 mm. (refractive index at 25°, D line, 1.4202).

*Example 7.*—A mixture containing 100 grams of cyclohexane, 22.0 grams of nickel carbonyl and 28 grams of ethylene was heated in a silver-lined shaker tube for 102 minutes at a temperature of 130° to 170° C. under a pressure of 560 to 755 atmospheres of CO:2H$_2$. Distillation of the resulting product gave 40.5 grams of crude propionaldehyde which contained a minor amount of the nickel carbonyl catalyst.

*Example 8.*—A mixture containing 7.0 grams of butadiene, 0.5 grams of hydroquinone and 128 cc. of a solution of cobalt carbonyl obtained by processing 10 grams of reduced, sintered cobalt oxide in 128 cc. of cyclohexane for one hour at 145° to 160° C. under a pressure of 650 to 700 atmospheres of CO was processed 0.5 hour at 110° to130° C. under 600 to 750 atmospheres of CO:2H$_2$. Distillation of the resulting product gave a series of aldehyde-containing fractions (carbonyl numbers=250 to 320) which had boiling points within the range of from 75° C. at 15 mm. to 86° C. at 4 mm.

*Example 9.*—A mixture containing 11 cc. of a cyclohexane solution of cobalt carbonyl, (0.01 gram Co per cc. cyclohexane) 140 cc. of diethyl ether and 42.1 grams of propylene was heated for one hour at a temperature of 100° to 160° C. under a pressure of 350 to 750 atmospheres of CO:2H$_2$. Distillation of the resulting product gave 25.5 grams of an n-butyraldehyde fraction (contaminated with cyclohexane), B. P. 53° C. to 72° C., and a fraction rich in n-butyraldehyde, B. P., 72° C.

*Example 10.*—A mixture containing 30 grams of Δ$^3$ - tetrahydrobenzaldehyde diisobutylacetal, 1.0 grams of cobalt (present as carbonyl) and 100 grams of cyclohexane was processed for two hours at a temperature of 110° to 130° C. under a pressure of 650 to 705 atmospheres of CO:H$_2$. Distillation of the resulting product gave 19 grams of a mixture of aldehydes and acetals boiling from 48° to 88° C. at a pressure of less than 1 mm.

*Example 11.*—A mixture containing 128 cc. cobalt carbonyl solution (prepared by processing 128 cc. cyclohexane and 10 grams reduced sintered alkali-free cobalt oxide for 1 hour at 155° to 165° C. under 650 to 820 atmospheres CO pressure) and 29.0 grams (0.5 mol) methyl vinyl ether was processed for 30 minutes in a silver-lined shaker tube with CO:2H$_2$ at 160° to 175° C. and 645 to 720 atmospheres total pressure. Distillation of the resulting product gave cyclohexane, methanol and acetaldehyde, and also 8.6 grams of material (B. P. 39° to 74° C. at 17 mm. pressure) having the properties of 3-methoxypropionaldehyde and its dimethyl acetal.

*Example 12.*—A mixture of carbon monoxide and hydrogen was compressed, deoxidized and mixed with deoxidized ethylene to form feed with a molar ratio of H$_2$:2CO:C$_2$H$_4$. This gaseous feed was then passed through a copper-lined tube concurrently with a 2.0% solution of cobalt carbonyl in xylene (4.5 lbs./lb.C$_2$H$_4$) under 700 atmospheres pressure at 140° C. The converter effluent was cooled and let down to atmospheric pressure. Analysis of the product showed that no cobalt carbonyl was decomposed during processing and that ethylene conversion was 48.5%, analytical yield to propionaldehyde 86%, and space time yield 31.5 lbs. propionaldehyde per hour per cubic foot of converter.

*Example 13.*—232 grams of an 8.4% solution of propionaldehyde in xylene containing 0.42% Co(CO)$_4$ was charged into a high pressure tube (23 in. long, inside diameter, 1.75 in.) packed with 0.25 in. glass Raschig rings. Carbon monoxide was bubbled upward through the charge at the rate of 3 cubic feet per hour (measured at standard temperature and pressure) under 200 atmospheres pressure and 140° C. for 5 hours. After cooling, letting down to atmospheric pressure and discharging the tube, analyses showed that no cobalt carbonyl was decomposed, no degradation of the propionaldehyde had occurred and that concentration of the aldehyde in the charge had been reduced to 2.7%. This recovered cobalt carbonyl solution was thus suitable for recycling with additional reactants. The exit gases were conducted through a receiver at about atmospheric pressure, thence through a cold scrubber containing ethyl benzene under atmospheric pressure at −80° C. In this manner 80% of the propionaldehyde which had been swept out of the high pressure vessel was recovered, chiefly in the cold scrubber, which was found to contain substantially none of the cobalt carbonyl.

A similar experiment with n-butyraldehyde in place of propionaldehyde gave a somewhat similar result, except that a large proportion of the recovered butyraldehyde (38% of the total butyraldehyde charged) was collected in the first atmospheric pressure receiver.

*Example 14.*—By processing 1H$_2$/2CO/1C$_3$H$_6$ with a 1.95% solution of Co(CO)$_4$ in diethylbenzene as described in Example 12 (700 atmospheres, 140° C., 4.7 lbs. of catalyst solution per lb. of propylene), 54.7% of the propylene was converted with an analytical yield to butyraldehyde of 89.5%. Of the butyraldehyde produced 81% was the normal aldehyde and 19% the isoaldehyde. In a similar run at 1000 atmospheres, the ratio of normal to iso-aldehyde was 84.5:15.5.

While, in the foregoing examples, the invention is illustrated as a method for the preparation of aldehydes, acetals and alcohols, it will be understood that the method can be adapted to the manufacture of other organic compounds derivable therefrom, such as esters, ethers, etc. When the reaction is conducted in the presence of alcohols, numerous oxygen-containing products, including acetals, are produced. In its broad aspect, the invention contemplates the introduction of carbon monoxide, and other substances capable of adding to unsaturated linkages, into reducible organic compounds by means of a metal carbonyl catalyst, especially under a sufficiently high pressure to suppress thermal decomposition of the metal carbonyl catalyst.

The invention may be carried out batchwise or continuously. Any suitable pressure-resistant vessel, such as an autoclave or tubular convertor, preferably made of or lined with inert materials such as glass, porcelain, inert metals and the like, may be employed. If desired, materials of construction yielding small amounts of metal carbonyls which are effective as catalysts may be employed. Outstanding results, however, are obtained in reaction vessels which are lined with silver or copper. In the continuous process, the reactants may be introduced at one or more points within the reaction vessel if desired.

Since many embodiments of the invention may be made without departing from the spirit and scope thereof, it will be understood that we do not limit ourselves except as set forth in the following claims.

We claim:

1. A process for the preparation of oxygen-containing organic compounds which comprises reacting an organic unsaturated compound containing olefinic unsaturation simultaneously with carbon monoxide and hydrogen in the presence of a catalytic quantity of a carbonyl of a metal having an atomic number of from 26 to 28 inclusive, said metal carbonyl being initially introduced as such into the reaction mixture, at a temperature of about 75° to 250° C. under a pressure within the range of 50 to 3000 atmospheres whereby thermal decomposition of the said metal carbonyl is suppressed, and an oxygen-containing reaction product is obtained.

2. A process for the preparation of propionaldehyde which comprises reacting ethylene simultaneously with carbon monoxide and hydrogen in the presence of a cobalt carbonyl catalyst, said cobalt carbonyl being the sole catalyst for the said reaction introduced into the reaction mixture, at a temperature within the range of 75° to 250° C. and a pressure within the range of 375 to 1500 atmospheres, whereby a reaction product containing propionaldehyde is produced without thermal decomposition of the said cobalt carbonyl, and thereafter separating the said propionaldehyde from the said reaction product.

3. In a process for the production of oxygen-containing organic compounds from olefins, carbon monoxide and hydrogen the steps which comprise recovering a volatile carbonyl of cobalt by passing a gas containing carbon monoxide at a temperature of 100° to 200° C. under a pressure above 100 atmospheres through a cobalt carbonyl-containing liquid reaction product obtained in the olefin—CO—$H_2$ reaction, whereby a volatile carbonyl of cobalt is carried out of the reaction mixture, and thereafter catalyzing the olefin—CO—$H_2$ reaction with the said carbonyl.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 1,973,662 | Schalch | Sept. 11, 1934 |
| 2,250,421 | Riblett | July 22, 1941 |
| 2,327,066 | Roelen | Aug. 17, 1943 |

FOREIGN PATENTS

| Number | Country | Date |
|---|---|---|
| 113,828 | Australia | Sept. 20, 1939 |

OTHER REFERENCES

BIOS Overall Report No. 1, "Report on the Petroleum and Synthetic Oil Industry of Germany," page 101, 1947, His Majesty's Stationary Office, London.

BIOS Final Report 447 (PB-77705), "Interrogation of Dr. Otto Roelen," page 45, 1947, Hobart Publishing Co.